US008089342B2

(12) United States Patent
Sugiura et al.

(10) Patent No.: US 8,089,342 B2
(45) Date of Patent: Jan. 3, 2012

(54) ELECTRONIC KEY SYSTEM AND METHOD

(75) Inventors: Masahiro Sugiura, Takahama (JP);
Hiromichi Naitoh, Okazaki (JP);
Munenori Matsumoto, Kariya (JP);
Noriaki Okada, Chiryu (JP);
Shinichirou Katou, Kariya (JP); Gorou Inoue, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1014 days.

(21) Appl. No.: 12/000,788

(22) Filed: Dec. 17, 2007

(65) Prior Publication Data

US 2008/0157919 A1     Jul. 3, 2008

(30) Foreign Application Priority Data

Dec. 28, 2006    (JP) ................................. 2006-354096

(51) Int. Cl.
| | |
|---|---|
| B60R 25/00 | (2006.01) |
| B60R 25/10 | (2006.01) |
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08B 1/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| H04W 24/00 | (2009.01) |

(52) U.S. Cl. ............ 340/5.72; 340/5.7; 340/539.32; 340/426.36; 340/426.13; 340/426.16; 340/426.17; 455/456.1; 455/456.2; 455/457

(58) Field of Classification Search ............ 340/539.32, 340/5.72, 426.35–36, 426.13–17, 539.13, 340/825.49, 5.7; 455/456.1–457; 342/357.54, 342/450, 457
See application file for complete search history.

(56) References Cited

U.S. PATENT DOCUMENTS 5,969,597 A * 10/1999 Weigl et al. ................. 340/5.61
(Continued)

FOREIGN PATENT DOCUMENTS

DE     198 02 532     8/1999
(Continued)

OTHER PUBLICATIONS

Anonymous, Adding a radio frequency-based locator feature to automotive key FOB, May 2002, Kenneth Mason Publications Ltd., Research disclosure# 457109.*

(Continued)

*Primary Examiner* — Daniel Wu
*Assistant Examiner* — Kam Ma
(74) *Attorney, Agent, or Firm* — Nixon & Vanderhye PC

(57) ABSTRACT

When a vehicle door locking operation is conducted, an in-vehicle device checks the vehicle compartment to determine whether a mobile unit exists in the vehicle compartment. When the in-vehicle device receives a response from the mobile unit indicating its presence in the compartment, the in-vehicle device receives a response from the mobile unit, prohibits the door from locking, and activates a buzzer. The mobile unit thus can be prevented from being locked in the vehicle compartment. When the mobile unit receives the search signal, it sounds its buzzer, thereby making it possible to further indicate its location within the compartment.

11 Claims, 7 Drawing Sheets

U.S. PATENT DOCUMENTS

| | | | |
|---|---|---|---|
| 6,087,987 A * | 7/2000 | Bachhuber et al. | 342/457 |
| 6,166,652 A * | 12/2000 | Benvenuti | 340/825.49 |
| 6,297,737 B1 * | 10/2001 | Irvin | 340/571 |
| 6,624,741 B1 * | 9/2003 | Dais et al. | 340/5.72 |
| 6,989,741 B2 * | 1/2006 | Kenny et al. | 340/505 |
| 2002/0025823 A1 * | 2/2002 | Hara | 455/456 |
| 2003/0014164 A1 * | 1/2003 | Shin | 701/2 |
| 2003/0117295 A1 * | 6/2003 | Okada | 340/825.72 |
| 2004/0066298 A1 * | 4/2004 | Schmitt et al. | 340/573.3 |
| 2005/0046568 A1 * | 3/2005 | Tanaka | 340/539.13 |
| 2005/0073388 A1 * | 4/2005 | Lee et al. | 340/5.1 |
| 2006/0028339 A1 * | 2/2006 | Ogino et al. | 340/539.32 |
| 2006/0080007 A1 * | 4/2006 | Gerard et al. | 701/2 |
| 2006/0082436 A1 * | 4/2006 | Kamiya et al. | 340/5.72 |
| 2006/0226976 A1 * | 10/2006 | Wei et al. | 340/539.32 |
| 2007/0030165 A1 * | 2/2007 | Teshima et al. | 340/825.49 |
| 2007/0075849 A1 * | 4/2007 | Pitt | 340/426.2 |

FOREIGN PATENT DOCUMENTS

| | | |
|---|---|---|
| DE | 19916308 A1 * | 10/2000 |
| DE | 103 17 658 | 11/2004 |
| EP | 1 041 227 | 10/2000 |
| EP | 1 170 711 | 1/2002 |
| JP | 62-90486 | 4/1987 |
| JP | 2000-326827 | 11/2000 |
| JP | 2005-220728 | 8/2005 |
| JP | 2005-232794 | 9/2005 |

OTHER PUBLICATIONS

Chinese Office Action dated Dec. 18, 2009, issued in corresponding Chinese Application No. 200710186180.7, with English translation.

U.S. Appl. No. 12/000,786, filed Dec. 17, 2007, Sugiura et al.

German Office Action dated May 20, 2010, issued in corresponding German Application No. 10 2007 062 643.8-51, with English translation.

Korean Office Action dated May 18, 2009, issued in corresponding Korean Application No. 10-2007-0138070, with English translation.

Chinese Office Action dated Jul. 31 2009, issued in corresponding Chinese Application No. 200710186180.7, with English translation.

* cited by examiner

ELECTRONIC KEY SYSTEM AND METHOD

CROSS REFERENCE TO RELATED APPLICATION

This application relates to and incorporates herein by reference Japanese Patent Application No. 2006-354096 filed on Dec. 28, 2006.

FIELD OF THE INVENTION

The present invention relates to an electronic key system and method.

BACKGROUND OF THE INVENTION

A conventional electronic key system for a vehicle is made up of an in-vehicle device that is mounted in a vehicle, and a mobile unit that is carried by a user of the vehicle. This electronic key system executes the control of the lock/unlock of doors or engine starting when authentication of the mobile unit is approved via radio communication between the in-vehicle device and the mobile unit, even if a mechanical key is not operated.

When the mobile unit of this electronic key system is lost, it is not easy to find the mobile unit. Therefore, JP 2005-220728A proposes a mobile unit locating device that is used when the user wants to locate the missing mobile unit. However, even when this mobile unit locating device is used, it is not frequently found at what specific location the mobile unit is at although it is possible to roughly know a certain area in which the mobile unit exists.

More specifically, for example, when the mobile unit is placed in a pocket of clothing or in a bag of a user, even if the area in which the mobile unit exists can be specified by using the mobile unit locating device, the user cannot sometimes find where the mobile unit exists within the area. In this case, when there are a lot of possible locations in which the mobile unit may be placed, user must search all those locations for the mobile unit, and therefore cannot find the mobile unit easily. Also, for example, when the mobile unit is lost outdoors at night, even if the area in which the mobile unit exists can be specified by using the mobile unit locating device, where the mobile unit is located cannot be found in a dark location with no light.

SUMMARY

It is therefore an object of the present invention to provide an electronic key system and method which can more readily locate a mobile unit.

According to the present exemplary embodiment, an electronic key system and method controls a door of a control object such as a vehicle. In this system and method, an in-object device provided in the control object communicates with a mobile unit carried by a user thereby to conduct an authentication of the mobile unit. When the mobile unit is authenticated, predetermined controls on the door of the control object by the mobile unit are allowed. The in-object device transmits a search signal from the in-object device for locating the mobile unit. When the mobile unit receives the search signal, it issues a notification indicating its existence.

BRIEF DESCRIPTION OF THE DRAWINGS

The above and other objects and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
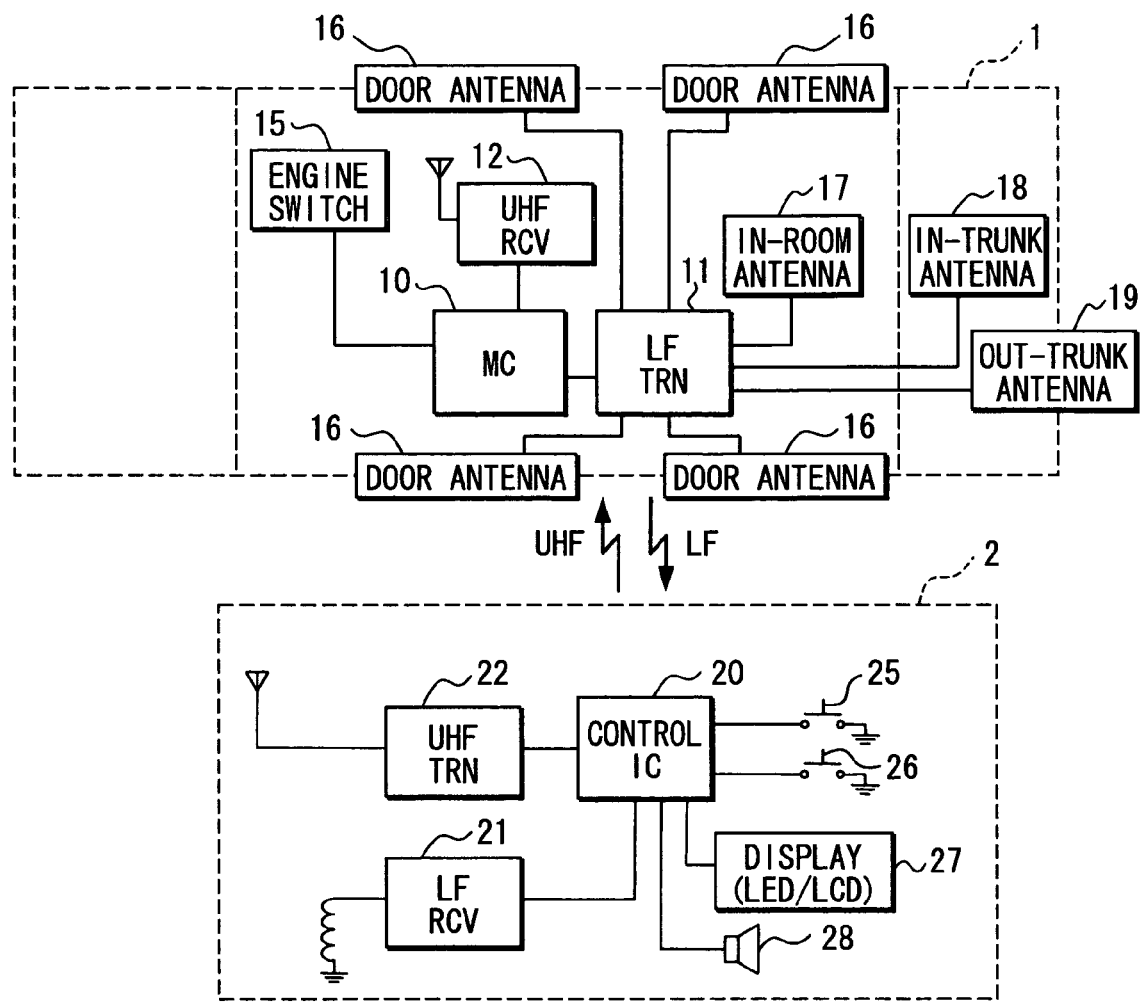
FIG. 1 is a block diagram showing an electronic key system according to a first embodiment of the present invention.

Referring first to FIG. 1, an electronic key system includes an in-vehicle device 1 that is mounted in a vehicle, and a mobile unit 2 carried by a user of the vehicle. This electronic key system may have both a smart entry function of executing the control of unlocking of doors when the mobile unit 2 that is carried by the user enters a radio communication area around the vehicle, and a remote keyless entry function of executing the control of locking or unlocking the doors according to a button operation of the mobile unit by the user at a place away from the vehicle. Both the smart entry function and the remote keyless entry function are known well in the art.

The in-vehicle device 1 includes a microcomputer 10, a low frequency (LF) transmitter unit 11, an ultra-high frequency (UHF) receiver unit 12, an engine switch 15, door antennas 16 provided on each door of the vehicle, a vehicle in-room antenna 17 provided in a passenger compartment, an in-trunk antenna 18 provided inside a trunk, and an out-trunk antenna 19 provided outside the trunk.

The LF transmitter unit 11 is means (first transmitter) for transmitting a radio signal to the mobile unit 2 by electric waves of an LF band (first frequency band). The radio signal that is transmitted from the LF transmitter unit 11 reaches the respectively limited communication areas through the door antennas 16, the in-room antenna 17, the in-room antenna 18, and the out-trunk antenna 19. The UHF receiver unit 12 is means for receiving a radio signal that are transmitted from the mobile unit 2 by electric waves of a UHF band (second frequency band).

The engine switch 15 is operable by the user to start an engine. When an operation of the engine switch 15 by the user is detected by a signal from the engine switch 15, the microcomputer 10 checks whether engine starting is allowed or not. When the engine starting is allowed, an engine start signal is transmitted from the microcomputer 10 to an engine control system (not shown).

The mobile unit 2 has a control IC 20, an LF receiver unit 21, a UHF transmitter unit 22, push switches 25, 26, a display unit 27, and a buzzer 28.

The LF receiver unit 21 is means (first receiver) for receiving the radio signal that is transmitted from the in-vehicle device 1 by the electric waves of the LF band. The UHF transmitter unit 22 is means (first transmitter) for transmitting a radio signal to the in-vehicle device 1 by the electric waves of the UHF band.

The push switches 25 and 26 are provided as keys that are triggers for mainly using the remote keyless entry function. In the case of conducting one-push operation, the push switch 25 locks the doors whereas the push switch 26 unlocks the doors.

The display unit 27 is made up of an LCD and an LED. When the mobile unit 2 is located, the display unit 27 is activated to blink the LED in the mobile unit 2 to notify the presence of the mobile unit 2 by means of light. The buzzer 28 blows to notify the presence of the mobile unit by means of sound. That is, both of the display unit 27 and the buzzer 28 are provided as notifying means.

For executing the smart entry function, respective portions of in-vehicle device 1 are operated while being controlled by microcomputer 10, and LF transmitter unit 11 periodically transmits a transmission request signal under control of microcomputer 10. Respective portions of mobile unit 2 are operated while being controlled by control IC 20. When mobile unit 2 enters either one of the radio communication areas of antennas 16 to 19 that can receive the transmission request signal from the LF transmitter unit 11, receiver unit 21 receives the transmission request signal.

A signal transmission using the electric waves of the LF band is conducted between the LF transmitter unit 11 and the LF receiver unit 21. This is because the detection area of the mobile unit 2 is limited to inside of and the outside periphery of the vehicle. In particular, when the signals are transmitted from the door antennas 16, the vehicle in-room antenna 17, the in-trunk antenna 18, and the out-trunk antenna 19, the detection area can be limited to the vicinity of the doors, the vehicle compartment, inside the trunk, and outside the trunk. As a result, it is possible to detect where the mobile unit 2 exists, and to prevent the mobile unit 2 from being locked in, for example, when the mobile unit 2 is left in the compartment or trunk.

When the LF receiver unit 21 receives the transmission request signal from the in-vehicle device 1, the UHF transmitter unit 22 transmits a response signal including an identification code (ID) specific to the vehicle corresponding to the mobile unit 2. Then, at the in-vehicle device 1, the UHF receiver unit 12 receives the response signal from the mobile unit 2.

A signal transmission using the electric waves of the UHF band is conducted between the UHF transmitter unit 22 and the UHF receiver unit 12. This is because a predetermined communication distance is obtained even if the output level of the mobile unit 2 is relatively small, and the response signal can be more surely transmitted to the in-vehicle device 1.

When the UHF receiver unit 12 receives the response signal from the mobile unit 2, the microcomputer 10 at the in-vehicle device 1 checks whether the ID included in the response signal agrees with the ID that is stored in the microcomputer 10 or not, for authentication. When both Ids agree, the unlocking of the doors is allowed.

In the subsequent process, a known control in the electronic key system of this type is executed. For example, when it is detected that the user or somebody else touched a door knob according to a signal from a touch sensor (not shown) which is disposed in the door knob outside of a driver's door in an unlocking enabled state, the microcomputer 10 transmits an unlock signal to a door control system. As a result, a door lock motor (not shown) is driven so that all of the doors are unlocked. In addition, other controls may be conducted such that the engine starting is enabled.

Figure 2:
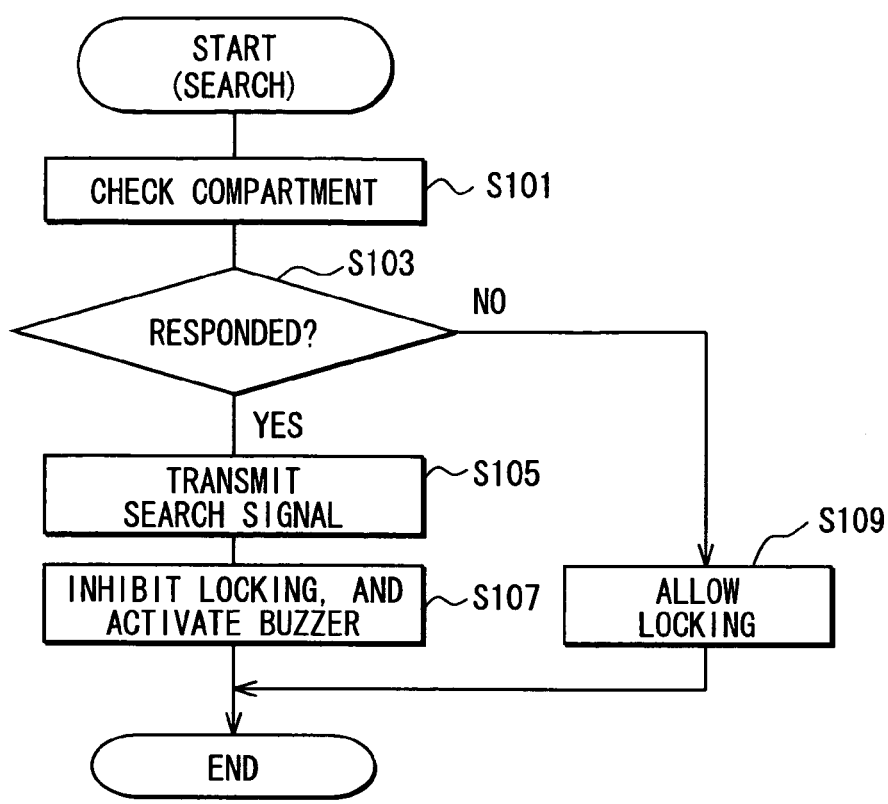
FIG. 2 is a flowchart showing a locating process according to the first embodiment.

The in-vehicle device 1 executes a mobile unit locating operation in a manner shown in FIGS. 2 and 3. First, a search process that is executed in the in-vehicle device 1 will be described with reference to a flowchart of FIG. 2. This process is executed with the locking operation of the vehicle which is conducted by the user as a trigger.

When the search process starts, the in-vehicle device 1 first executes vehicle compartment checking (step (S) 101). In the process of S101, a confirmation signal for confirming or checking whether the mobile unit 2 exists in the compartment or not is transmitted from the in-room antenna 17 and the in-trunk antenna 18.

Subsequently, the in-vehicle device 1 checks whether a response is received from the mobile unit 2 or not (S103). In this example, when the response is received from the mobile unit 2 (Yes in S103), the in-vehicle device 1 transmits a search signal (S105). In the process of S105, the search signal for searching or locating the mobile unit 2 is transmitted from the vehicle in-room antenna 17 or the in-trunk antenna 18.

Then, the in-vehicle device 1 instructs a locking inhibition to the door control system, and brings a buzzer (not shown) disposed in the vehicle into a blowing state for a given period of time (for example, 10 seconds) (S107), and completes the locating process.

On the other hand, in the process of S103, when no response is received from the mobile unit 2 (No in S103), the in-vehicle device 1 allows and instructs door locking by the door control system (S109), and completes the locating process. As a result, the locking control is conducted by the door control system, and for example, the door lock motor (not shown) is driven to bring all of the doors in the unlocked state.

In the process of S101, the vehicle compartment checking is merely conducted without particularly clearly distinguishing the vehicle compartment and the trunk compartment from each other in the above description. Alternatively, the vehicle compartment checking and the trunk compartment checking may be executed at the same time without clearly distinguishing those checkings from each other, or may be sequentially executed with clearly distinguishing those checkings from each other.

Also, in the process of S101 to S103, it is unnecessary to determine whether the response is received or not, according to only one confirmation signal transmission. For example, when no response is received by one confirmation signal transmission, the transmission of the confirmation signal is again repeated. When no response is received even if a predetermined number of confirmation signal transmissions are repeated, a negative determination may be conducted in the process of S103.

Also, waiting may be conducted until the response is received even if no response is received until a given period of time has elapsed. Then, the determination may be conducted as no response unless the response is received at a time when a given period has elapsed. Likewise, this is applied to a case in which the transmission and determination of the confirmation signal is repeated by a given number of times.

Figure 3A:
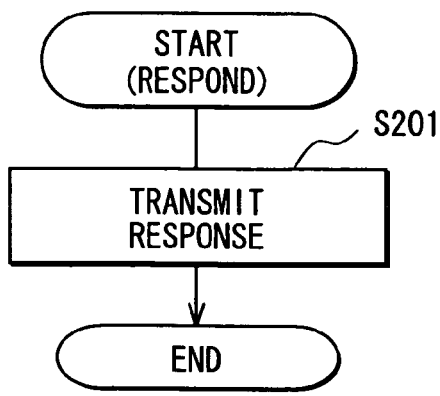
FIGS. 3A and 3B are flowcharts showing a response process and a notifying process according to the first embodiment.

When the above locating process is executed by the in-vehicle device 1, and the confirmation signal that has been transmitted in the process of S101 reaches the mobile unit 2, a response process shown in FIG. 3A is executed in the mobile unit 2 with the reception of the confirmation signal as a trigger.

That is, when the response process starts, the mobile unit 2 transmits the response to the in-vehicle device 1 (S201), and completes the response process. When the response that is transmitted in the process of S201 is received by the in-vehicle device 1, the affirmative determination (Yes) is made in the above process of S103.

Figure 3B:
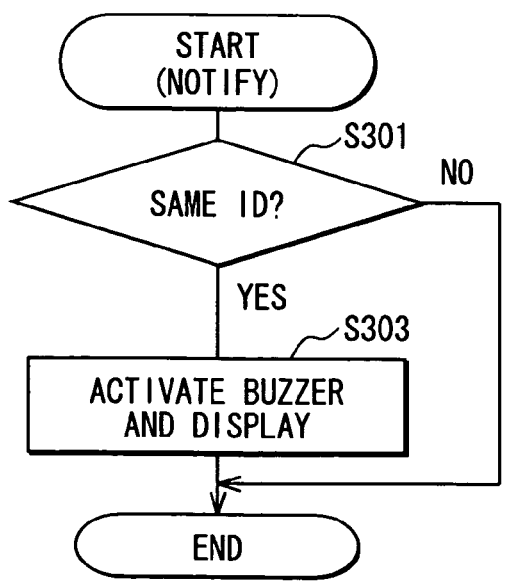

When the search signal that has been transmitted in the process of S105 reaches the mobile unit 2, the notifying process shown in FIG. 3B is executed in the mobile unit 2 with the reception of the search signal as a trigger.

That is, when the notifying process starts, the mobile unit 2 first checks whether an ID that is included in the received search signal agrees with an ID of the mobile unit 2 which has been registered in a nonvolatile memory that is incorporated into the control IC 20 or not (S301).

When those IDs do not agree with each other (No) In the process of S301, the mobile unit 2 can determine that the mobile unit 2 is not to be located or searched, and therefore completes the notifying process. On the other hand, when those IDs agree with each other (Yes) in the process of S301, the mobile unit 2 activate the buzzer 28 into a blowing state and the LED into a blink lighting state for a given period of time (for example, 10 seconds) (S303) so that it may be easily recognized by the user, and completes the notifying process.

In the above embodiment, when the search signal for locating the mobile unit 2 is transmitted from the in-vehicle device 1 to the mobile unit 2, the display unit 27 or the buzzer 28 which are provided in the mobile unit 2 operate, and indicates that the mobile unit 2 exists by issuing sound and light as a notification of its reception of the search signal and its existence. Accordingly, even if the mobile unit 2 is placed in a pocket of clothing or a bag which is located in the compartment of the vehicle, the user can easily find out the mobile unit 2 by means of sound that is issued by the buzzer 28. Also, the user can easily find out the mobile unit 2 by means of light that is emitted by the display unit 27 even in a state where the vehicle compartment is dark, for example, in the night.

Also, since the mobile unit 2 is located by the in-vehicle device 1 that is mounted in the vehicle, a dedicated mobile unit locating device is not required. Also, unlike a compact mobile unit locating device, the in-vehicle device 1 does not suffer from such drawbacks that the user does not tuck the in-vehicle device 1 in some place, and also does not forget the place in which the in-vehicle device 1 is tucked.

Further, the above electronic key system checks whether the mobile unit 2 is confined in the vehicle compartment or not, when the locking operation is conducted in the vehicle. When the electronic key system detects that the mobile unit 2 is confined in the vehicle compartment, the system executes the locating of the mobile unit 2 in association with that detection. Accordingly, not only the mobile unit 2 is prevented from being confined in the vehicle compartment, but also the mobile unit 2 that disables the locking operation can be easily found out by the user.

Second Embodiment

Figure 4:
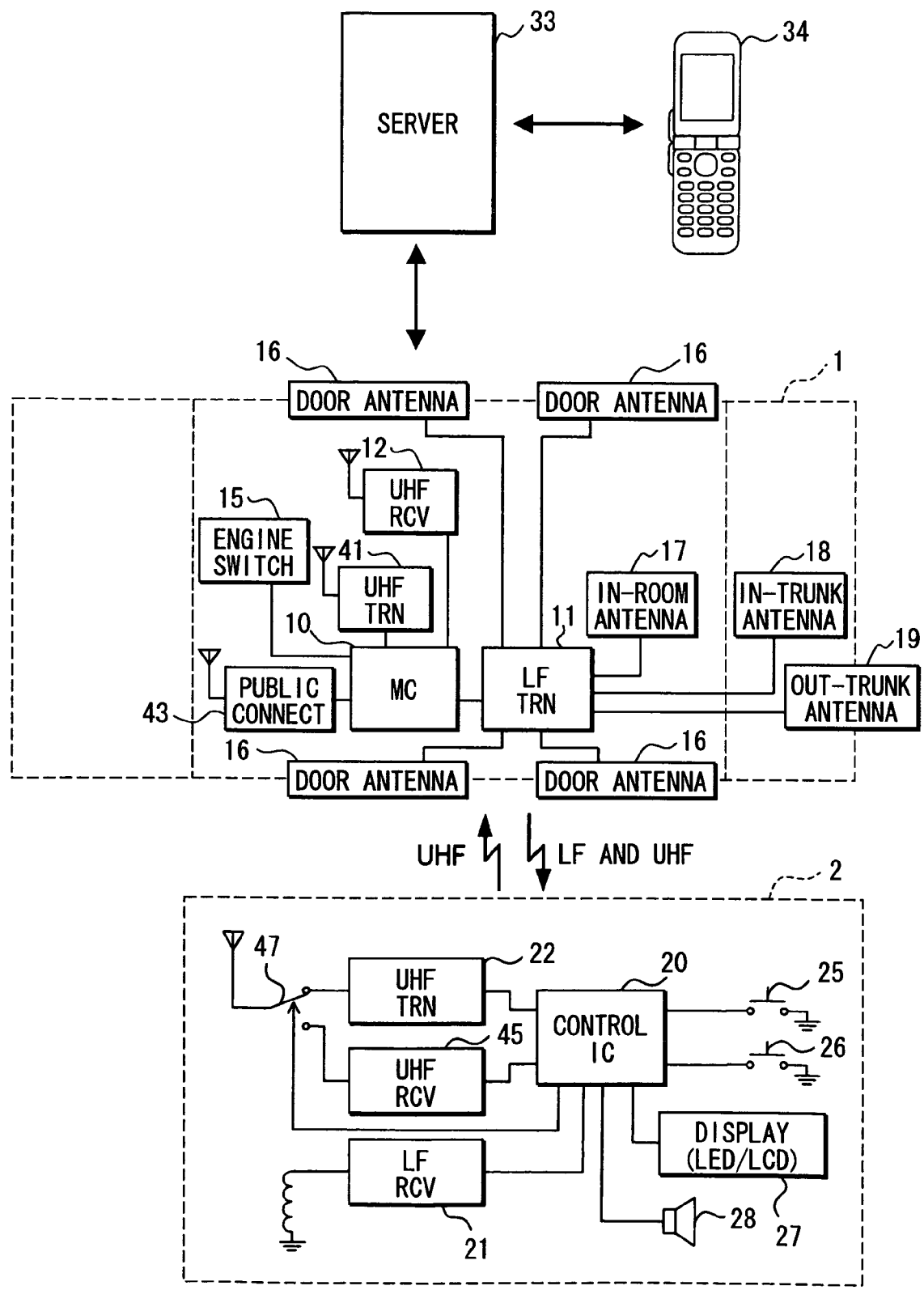
FIG. 4 is a block diagram showing an electronic key system according to a second embodiment of the present invention.

In a second embodiment, as shown in FIG. 4, the electronic key system includes the in-vehicle device 1 that is mounted in the vehicle, and the mobile unit 2. In addition to the configuration of the first embodiment, the in-vehicle device 1 is configured to be able to conduct data communication with a management server 33, and communicate with a cell phone 34 via the management server 33. Further, the in-vehicle device 1 includes a UHF transmitter unit (second transmitter) 41 and public phone line connecting unit 43.

The UHF transmitter unit 41 is disposed to transmit the search signal to the mobile unit 2 when the mobile unit 2 is located. The UHF transmitter unit 41 is not alternative means of the LF transmitter unit 11, but both of the LF transmitter unit 11 and the UHF transmitter unit 41 function as means for transmitting the search signal to the mobile unit 2, respectively.

The public line connecting unit 43 is a device corresponding to a telephone, which is so designed as to be connected to a public line (telephone network) via a base station having a radio communication facility to call another telephone or conduct data communication with another device via the telephone network.

For example, the use of the public line connecting unit 43 makes it possible to make a phone communication with a help desk when a trouble occurs in the vehicle. Also, in a process described later, the public line communication connecting unit 43 is used in the case of conducting the data communication with the management server 33.

In addition to the configuration of the first embodiment, the mobile unit 2 has a UHF receiver unit (second receiver) 45 and a transmit/receive changeover switch 47. The UHF receiver unit 45 is so disposed as to receive the search signal that is transmitted to the mobile unit 2 when the mobile unit 2 is located in the vehicle. As described above, in this embodiment, the search signal is transmitted from both of the LF transmitter unit 11 and the UHF transmitter unit 41. Both of the LF receiver unit 21 and the UHF receiver unit 45 function as means for receiving the search signal at the mobile unit 2.

The transmit/receive changeover switch 47 is a switch that conducts changeover control by means of the control IC 20. The transmit/receive changeover switch 47 changes over whether the transmission is conducted by the UHF transmitter unit 22, or the reception is conducted by the UHF receiver unit 45. In this embodiment, there is applied a configuration in which the transmit/receive changeover switch 47 changes over the transmission or reception to conduct a half-duplex communication. However, as long as the transmission and reception is possible, another configuration may be employed. For example, the transmit/receive changeover switch 47 is replaced with a circulator, thereby conducting transmission or reception by full duplex communication.

Further, the management server 33 has a function of conducting a data communication with the in-vehicle device 1 (public line connecting unit 43) or the cell phone 34 via the public line. Also, the cell phone 34 has a function of conducting data communication with the management server 33 via the public line.

Data of the format that complies with the unique standard of the present electronic key system is transmitted or received between the in-vehicle device 1 and the management server 33 according to the communication protocol that is defined by that standard. This is because the data format or the communication protocol is not particularly defined when necessary information can be mutually transmitted at the time of communicating with the in-vehicle device 1, and therefore countermeasures such as conversion of data into e-mail format is unnecessary.

On the other hand, data of the e-mail format is transmitted or received between the management server 33 and the cell phone 34. This is because the data format or the communication protocol which complies with the standard of the cell phone 34 is used at the time of communicating with the cell phone 34, and also the data must be converted into formation of the type which can be provided to the user through the user interface at the cell phone 34.

Figure 5:
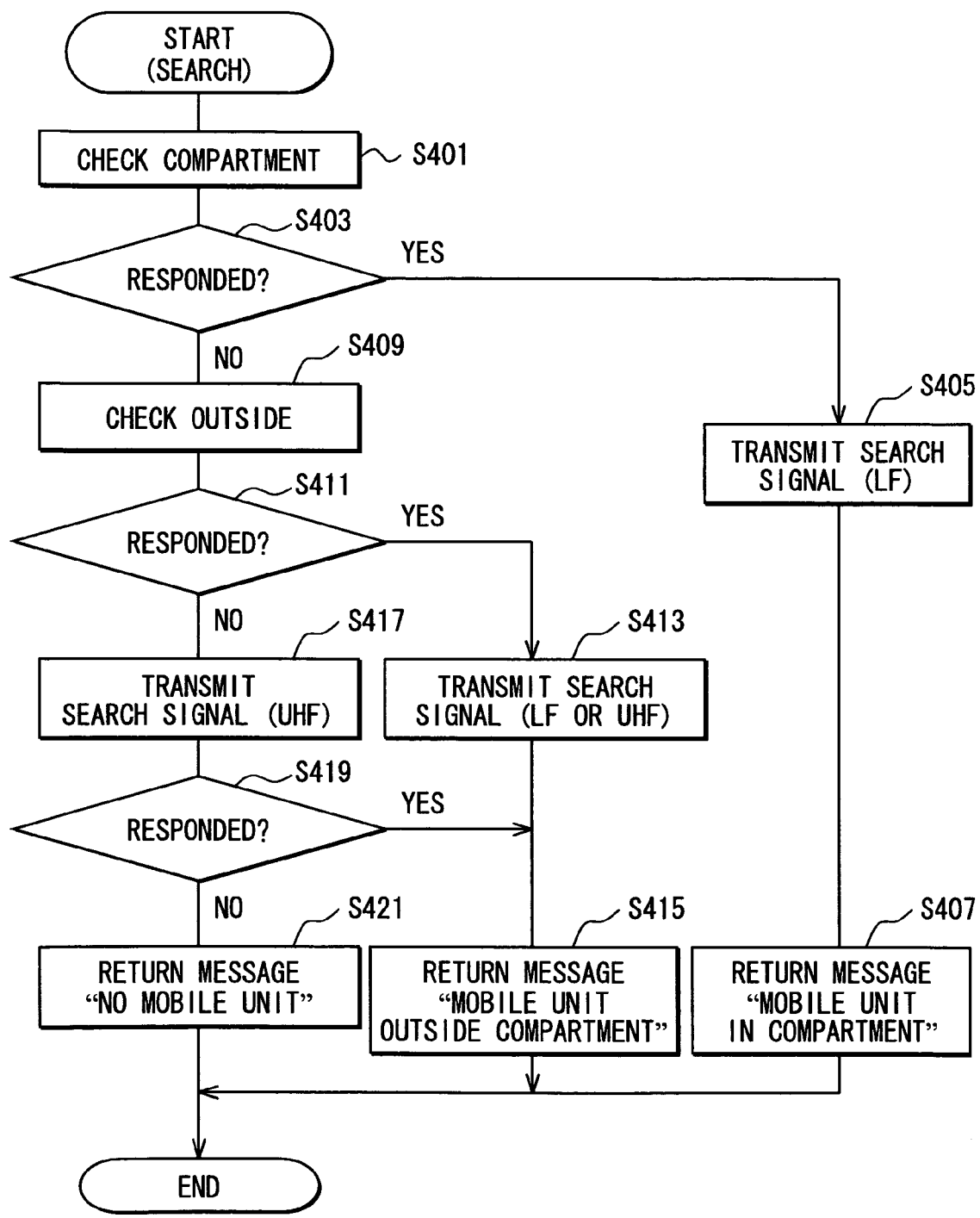
FIG. 5 is a flowchart showing a locating process according to the second embodiment.
Figure 6:
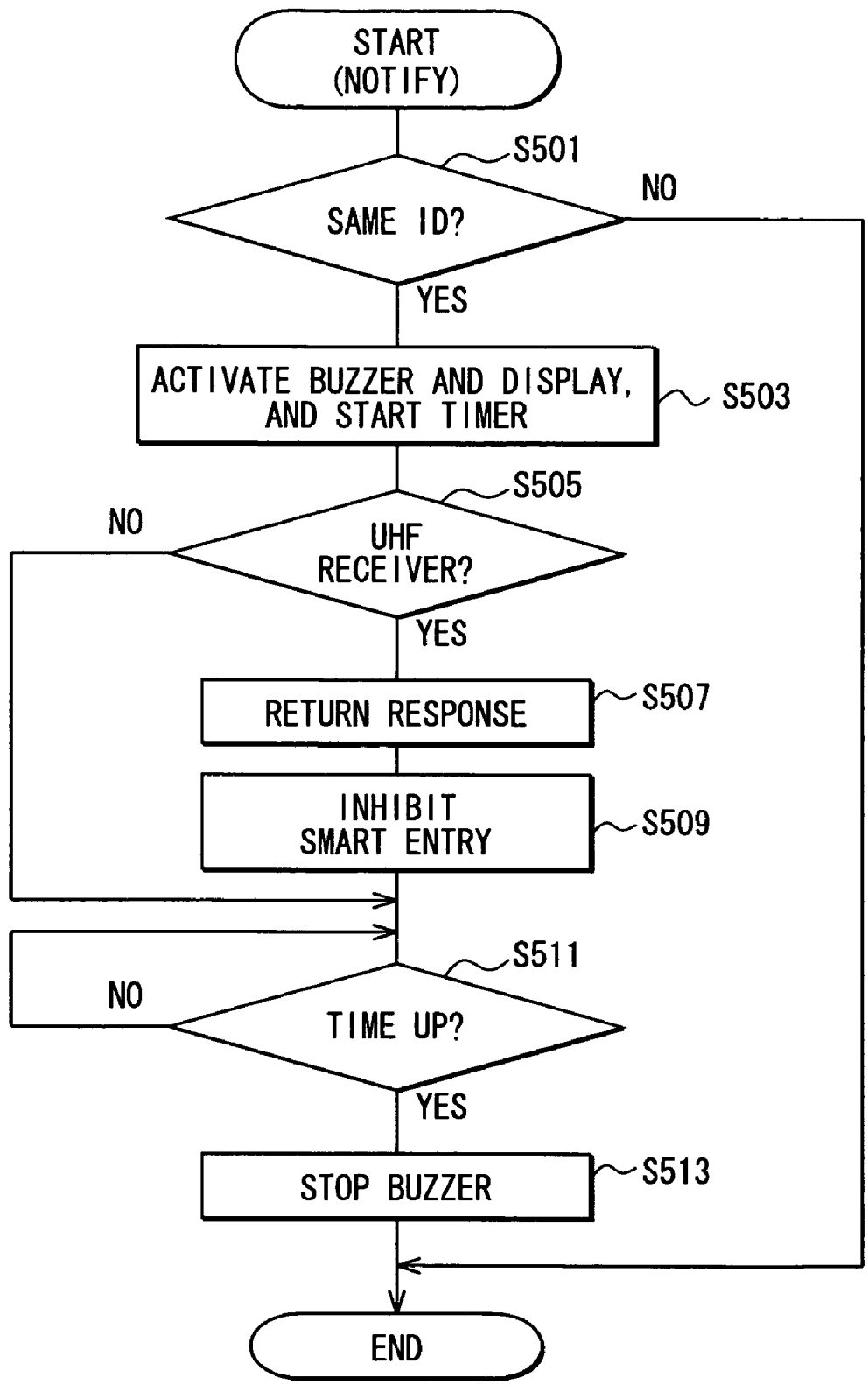
FIG. 6 is a flowchart showing a notifying process according to the second embodiment.

The electronic key system performs a mobile unit locating operation as shown in FIGS. 5 and 6.

First, a search process that is executed in the in-vehicle device 1 which is a locating side will be described with reference to a flowchart of FIG. 5. This search process is executed when the user conducts the operation on the cell phone 34 to instruct the locating of the mobile unit 2.

For this purpose, a mobile unit locating application program is stored in the cell phone 34. When the application program has been registered in the cell phone 34, information necessary for communication with the in-vehicle device 1 or the management server 33 is input by the user, and registered in a nonvolatile memory that is equipped in the cell phone 34. Also, a part of the information is also transmitted to the management server 33 and the in-vehicle device 1, and then registered in a memory unit disposed in the management server 33 and the in-vehicle device 1, respectively.

When the user starts the mobile unit locating application program and conducts the operation for instructing the locating of the mobile unit 2 in the cell phone 34, an electronic mail that describes necessary information in a given form is produced by the function of the application program, and the electronic mail is transmitted to the management server 33.

The management server 33 analyzes the information that has been described in the electronic mail with the reception of the electronic mail as a turning point to produce data for instructing the locating of the mobile unit 2 to the in-vehicle device 1. Then, that data is transmitted to the in-vehicle device 1.

When the data that is transmitted from the management server 33 reaches the in-vehicle device 1, the in-vehicle device 1 receives the data, and executes the search process shown in FIG. 5 with the data reception as a trigger.

When the search process starts, the in-vehicle device 1 first executes vehicle compartment checking (S401). In the process of S401, the confirmation signal for confirming whether the mobile unit 2 exists or not is transmitted from the vehicle in-room antenna 17 and the in-trunk antenna 18.

Subsequently, the in-vehicle device 1 checks whether the response is received from the mobile unit 2 or not (S403). In this example, when the response is received from the mobile unit 2 (Yes in S403), the in-vehicle device 1 transmits the search signal (S405). In the process of S405, the search signal for locating the mobile unit 2 is transmitted from the vehicle in-room antenna 17 and the in-trunk antenna 18.

Then, the in-vehicle device 1 executes a message return process to the cell phone 34 (S407), and completes the locating process. Through the process of S407, the electronic mail that describes a message indicative of "The mobile unit is in the vehicle compartment" reaches the cell phone 34.

More specifically, in the process of S407, the information required to transmit the electronic mail that describes the above message to the management server 33 is transmitted to the management server 33. At a stage of transmitting the information from the in-vehicle device 1 to the management server 33, when the information means "The mobile unit is in the vehicle compartment," it is unnecessary to transmit text data having the above description, as long as a bit train representative of the necessary information is transmitted.

The management server 33 that has received the above information produces data of the electronic mail form on the basis of the received information, and transmits the data to the cell phone 34. That is, the management server 33 produces the text data describing "The mobile unit is in the vehicle compartment," and the electronic mail including the text data is transmitted to the cell phone 34 from the management server 33. As a result, as described above, the electronic mail that describes the massage indicative of "The mobile unit is in the vehicle compartment" reaches the cell phone 34.

On the other hand, when no response is received from the mobile unit 2 (No in S403), the in-vehicle device 1 executes vehicle exterior checking (S409). In the process of S409, the confirmation signal for confirming whether the mobile unit 2 exists in the outside of the vehicle or not is transmitted from the door antennas 16 and the out-trunk antenna 19.

Subsequently, the in-vehicle device 1 checks whether the response is received from the mobile unit 2 or not (S411). In this example, when the response is received from the mobile unit 2 (Yes in S411), the in-vehicle device 1 transmits the search signal (S413). In the process of S413, the search signal for locating the mobile unit 2 is transmitted from the door antennas 16 and the out-trunk antenna 19. Alternatively, the search signal for locating the mobile unit 2 may be transmitted from the UHF transmitter unit 41.

When the search signal is transmitted from the door antenna 16 and the out-trunk antenna 19, the search signal is transmitted from the LF transmitter unit 11 by the electric wave of the LF band. Also, when the search signal is transmitted from the UHF transmitter unit 41, the search signal is transmitted by the electric wave of the UHF band.

Which of the frequency bands to be used to transmit the search signal is arbitrary. In this embodiment, even if the mobile unit 2 receives the search signal that has been transmitted by the electric wave of the LF band through a process that will be described later, the smart entry function is not limited. On the contrary, when the mobile unit 2 receives the search signal that has been transmitted by the electric wave of the UHF band, the smart entry function is limited and not allowed.

Accordingly, when it is proved that the mobile unit 2 exists in the vehicle exterior close to the vehicle as a result of locating, any one frequency band can be selected in advance taking into consideration whether the smart entry function should be limited or not. Alternatively, in the above case, which frequency band should be used can be arbitrarily set and changed by the user.

After the process of S413 has been completed, the in-vehicle device 1 then executes a message return process to the cell phone 34 (S415), and completes the locating process. Through the process of S415, the electronic mail that describes the message indicative of "The mobile unit is outside the vehicle compartment" reaches the cell phone 34. The manner that the electronic mail reaches the cell phone 34 is the same as the process of S407.

On the other hand, when no response is received from the mobile unit 2 (No in S411), the in-vehicle device 1 transmits the search signal (S417). In the process of S417, the search signal for locating the mobile unit 2 is transmitted from the UHF transmitter unit 41. As a result, the search signal is transmitted to the mobile unit 2 whose presence could not be confirmed within a range where the communication of the LF band is enabled by the electric wave of the UHF band longer in the communication distance than the LF band.

Then, the in-vehicle device 1 checks whether the response is received from the mobile unit 2 or not (S419). In this situation, when the response is received from the mobile unit 2 (Yes in S419), the processing is advanced to the process of S415 described above. The in-vehicle device 1 executes the message return process to the cell phone 34 (S415), and completes the locating process. Through the process of S415, the electronic mail that describes the message indicative of "The mobile unit is outside the vehicle compartment" reaches the cell phone 34.

On the other hand, when no response is received from the mobile unit 2 (No in S419), the in-vehicle device 1 executes a message reply process to the cell phone 34 (S421), and completes the locating process. Through the process of S421, the electronic mail that describes the message indicative of "No mobile unit is found" reaches the cell phone 34. The manner that the electronic mail reaches the cell phone 34 is the same as the process of S407.

When the above locating process is executed by the in-vehicle device 1, and the search signal that has been transmitted in any processes of S405, S413, and S417 reaches the mobile unit 2, the mobile unit 2 executes a notifying process shown in FIG. 6 with the reception of the search signal as a trigger.

That is, when the notifying process starts, the mobile unit 2 first checks whether an ID that is included in the received search signal agrees with an ID of the mobile unit 2 or not which has been registered in a nonvolatile memory that is incorporated into the control IC 20 or not (S501).

In the process of S501, when those IDs do not agree with each other (No in S501), the mobile unit 2 determines that the mobile unit 2 is not to be located, and therefore completes the notifying process. On the other hand, when those IDs agree with each other (Yes in S501), the mobile unit 2 activates the buzzer 28 and the display (LED) 27 into the blowing state and the lighting state, and starts a timer (S503).

Then, the mobile unit 2 checks whether the UHF receiver unit 45 has received the search signal (S505). In this example, when the UHF receiver unit 45 receives the search signal (Yes in S505), the mobile unit 2 returns the response to the in-vehicle device 1 (S507), and changes the status of the mobile unit 2 to the state in which the smart entry function is prohibited (S509).

In more detail, in the process of S509, the status of the mobile unit 2 changes from a normal state to a limited state. When the status of the mobile unit 2 is changed to the limited state, even if a radio communication for authentication is conducted between the mobile unit 2 and the in-vehicle device 1, the in-vehicle device 1 can recognize that the status of the mobile unit 2 has been changed to the limited state on the basis of the information that is obtained by the radio communication. Accordingly, in this case, the execution of the various controls by the in-vehicle device 1 can be limited by the in-vehicle device 1.

Alternatively, in the case where the status of the mobile unit 2 has been changed to the limited state, when the radio communication with respect to the in-vehicle device 1 completely stops at the mobile unit 2, the in-vehicle device 1 cannot recognize the presence per se of the mobile unit 2. Accordingly, even in this method, it is possible to limit the execution of the various controls by the in-vehicle device 1.

Although various controls to be limited are proposed, the following control is limited in this embodiment. That is, when the status of the mobile unit 2 is the normal state, the in-vehicle device 1 conducts the unlocking control of the doors with the fact that the user who carries the mobile unit 2 touches a door knob as a turning point. On the other hand, when the status of the mobile unit 2 is the limited state, such an unlocking control is limited. As a result, it is possible to prevent a prowler from entering the vehicle compartment, or articles from being stolen from the vehicle compartment.

Also, the same control is implemented in the trunk of the vehicle, thereby making it possible to prevent the articles from being stolen from the trunk.

Further, when the status of the mobile unit 2 is the normal state, the in-vehicle device 1 conducts the starting control of an engine with the fact that the user who carries the mobile unit 2 operates the engine switch 15 as a turning point. However, when the status of the mobile unit 2 is the limited state, such an engine starting control is limited. As a result, it is possible to prevent the prowler from starting the engine for the vehicle.

When the unlocking control is limited, since the prowler can be normally prevented from entering the vehicle compartment, it is possible to block the engine starting by the limit of the unlocking control. However, since there is the possibility that the prowler enters the vehicle compartment by breaking a window or prizing a door, it is effective to limit the starting control by the engine switch 15. Further, when those things occur, it is possible to use various security functions such that an alarm sound is issued together. When the above prohibition control of the smart entry function is attained, it is necessary to conduct given operation that is known by only the user in order to cancel the prohibition control, which will be described in more detail later.

On the other hand, when it is determined that the search signal is received by the LF receiver unit 21 (No in S505), the above processes of S507 and S509 are skipped.

The process of S507 is skipped when the LF receiver unit 21 receives the search signal, because there arises no problem even if no response is sent from the mobile unit 2 again. This is because the in-vehicle device 1 recognizes that the mobile unit 2 has been already detected through the processes of S401 to S411. In this respect, when the UHF receiver unit 45 receives the search signal, a reply sent in the process of S507 is essential in conducting the determination process of S419 at the in-vehicle device 1.

Also, when the search signal is received by the LF receiver unit 21, the process of S509 is skipped. This is because, for example, in the case where the mobile unit 2 is located in a state where the mobile unit 2 is left behind in the vehicle compartment, when the above prohibition control of the smart entry function is conducted each time, the necessity of the operation for canceling the prohibition control in each case is troublesome for the user.

That is, in the case where the mobile unit 2 falls at a position apart from the vehicle, when the buzzer 28 is blown by the process of S503, there is a possibility that the prowler other than the authorized user is aware of the presence of the mobile unit 2 and picks up the mobile unit 2. For this reason, in this case, it is preferable to conduct the prohibition control of the smart entry function by the process of the above S509.

However, when the mobile unit 2 is left in the vehicle, it is usually presumed that the authorized user retrieves the mobile unit 2 in the vicinity of the vehicle. Similarly, when locking of the mobile unit 2 in the vehicle compartment is detected by the locking operation as described in the above first embodiment, and the mobile unit locating is executed in association with the detection, it is presumed that the authorized user who is going to conduct the locking operation is in the vicinity of the vehicle.

Accordingly, in this case, since the authorized user can immediately find the mobile unit 2 when the buzzer 28 is blown by the process of S503, the possibility that a prowler picks up the mobile unit 2 is extremely low. Hence, in this case, the above process of S509 can be skipped, as a result of which it is unnecessary to conduct the cancel operation that is troublesome for the user.

In order to further enhance the security, the prohibition control of the smart entry function is always conducted when the mobile unit 2 is retrieved. Alternatively, it is possible that the user arbitrarily changes setting of whether the prohibition control of the smart entry function is always conducted, or the prohibition control of the smart entry function is conducted only when the UHF receiver unit 45 receives the search signal.

After the above processes of S507 and S509 are completed or skipped, the processing is advanced to the process of S511, and the mobile unit 2 checks whether time up is made or not (S511). In the process of S511, when a given period of time (10 seconds in this embodiment) has not elapsed from a timer start in the process of S503, it is determined that no time up is made (No in S511), and in this case, the process of S511 is kept to wait until the given period of time elapses.

Then, when it is determined that the given period of time has elapsed, and time up is made (Yes in S511), the buzzer 28 stops (S513) to complete the notifying process.

Figure 7:
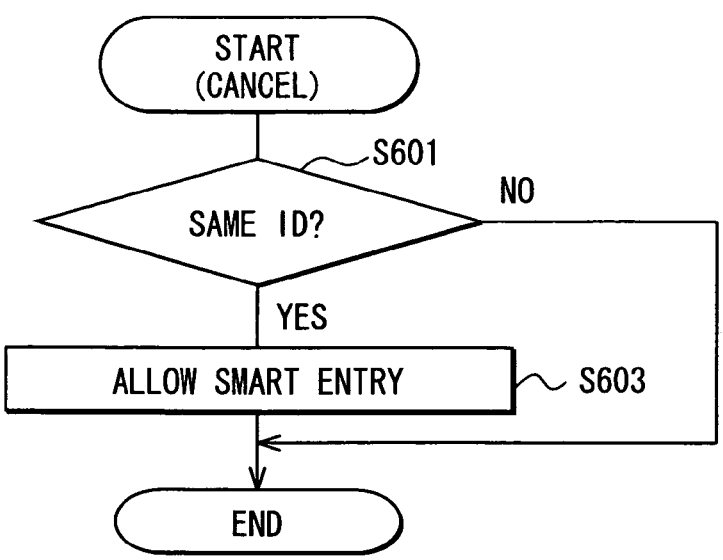
FIG. 7 is a flowchart showing a cancel process (No. 1) according to the second embodiment.
Figure 8:
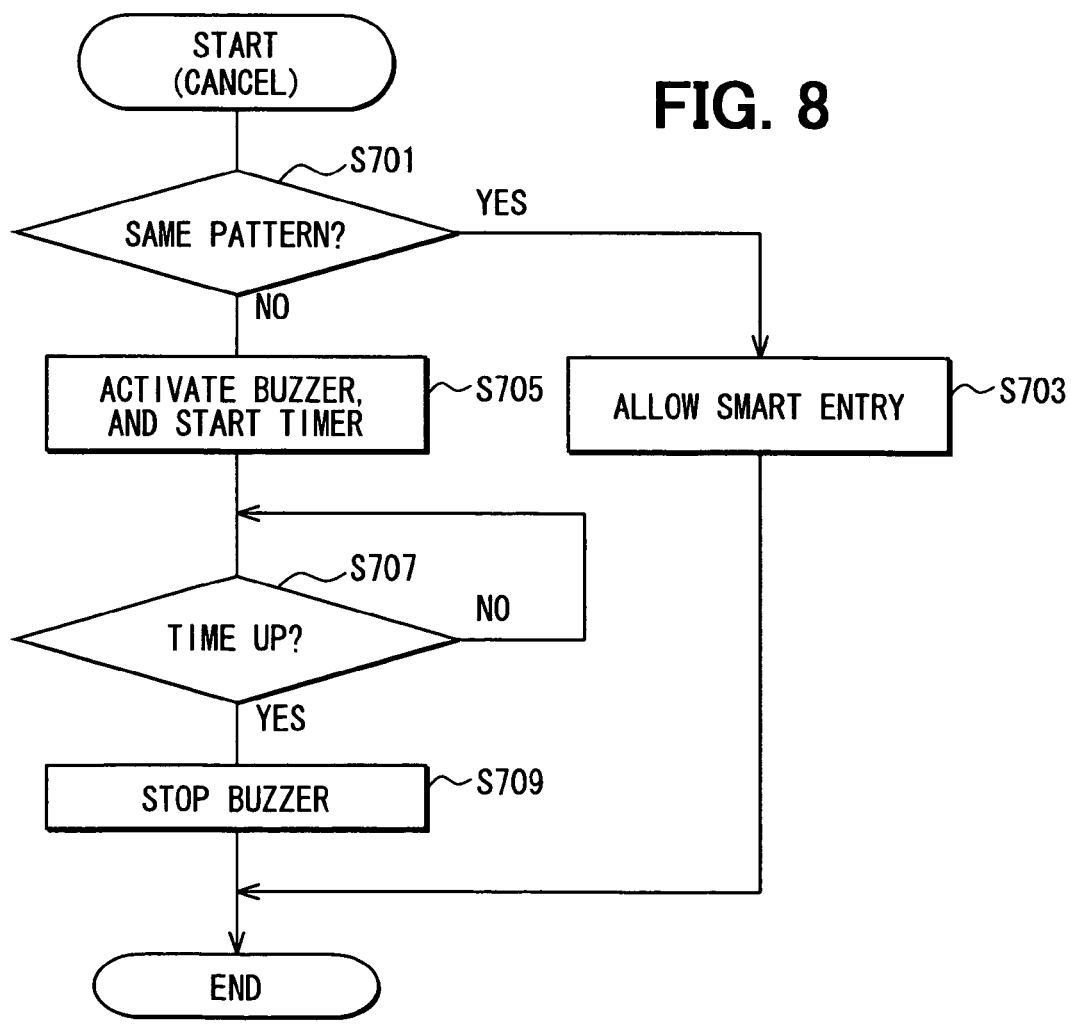
FIG. 8 is a flowchart showing a cancel process (No. 2) according to the second embodiment.

Subsequently, a prohibition cancel process of the smart entry function is attained as shown in FIGS. 7 and 8. The respective processes of FIGS. 7 and 8 are examples of the prohibition cancel process of the smart entry function. The process shown in FIG. 7 is an example in which the prohibition cancel of the smart entry function is conducted via a communication with another device. The process shown in FIG. 8 is an example in which the prohibition cancel of the smart entry function is conducted by the operation of the mobile unit 2 by the user.

First, the process shown in FIG. 7 is executed in the mobile unit 2 with the reception of the cancel signal as a trigger in the case where the cancel signal reaches the mobile unit 2, when the cancel signal is transmitted from another device to the mobile unit 2.

In this example, another device may be the in-vehicle device 1 or a dedicated device provided in an automobile dealer. When another device is the in-vehicle device 1, an instruction is transmitted to the in-vehicle device 1 from the user by using a user interface of the cell phone 34, like the process shown in FIG. 5. The in-vehicle device 1 that has received the instruction executes the cancel signal transmission.

When the mobile unit 2 that has received the cancel signal starts the process shown in FIG. 7, the mobile unit 2 first checks whether the ID that is included in the received search signal agrees with the ID of the mobile unit 2 which has been registered in the nonvolatile memory that is incorporated into the control IC 20 or not (S601).

When those IDs do not agree with each other (No in S601), the mobile unit 2 can determine that the mobile unit 2 is not to be located, and therefore completes the process shown in FIG. 7. On the other hand, when those IDs agree with each other (Yes in S601), the status of the mobile unit 2 is returned to the normal state from the limited state, thereby canceling the prohibition of the smart entry function, that is, allowing the smart entry function (S603), and completes the process shown in FIG. 7. As a result, since the status of the mobile unit 2 is returned to the normal state, the smart entry function can be thereafter used by the mobile unit 2.

The process in FIG. 8 is executed with the operation of the push switches 25 and 26 on the mobile unit 2 in a given procedure or pattern by the user as a trigger. The given procedure or pattern includes a procedure that has been registered by the user in advance, and a procedure of inputting a security code or a password which is known only by the user.

In this process, the mobile unit 2 checks whether or not the operation pattern of the push switches 25 and 26 agrees with and same as the operation pattern that has been registered in the nonvolatile memory provided in the control IC 20 in advance (S701).

When the operation patterns agree with each other (Yes in S701), the status of the mobile unit 2 is returned to the normal state from the limited state, thereby canceling the prohibition of and allowing the smart entry function (S703). As a result, since the status of the mobile unit 2 is returned to the normal state, the smart entry function can be thereafter used by the mobile unit 2.

On the other hand, when the operation patterns do not agree with each other (No in S701), the mobile unit 2 activates the buzzer 28, and starts the timer (S705). Thereafter, the mobile unit 2 checks whether time up is made or not (S707). When it is determined that no time up is made (No in S707), the process of S707 is kept to wait until the given period of time (e.g., 10 seconds) elapses.

Then, when it is determined that the given period of time has elapsed, and time up is made (Yes in S707), the buzzer 28 is stopped (S709) to complete the process shown in FIG. 8.

The buzzer 28 is blown by the process of S705, because when the authorized user erroneously conducts the cancel operation, the fact is notified. Also, this is because when the prowler attempts the cancel operation, the sound intimidates the prowler so that the prowler gives up the cancel operation.

According to the second embodiment, when the search signal for locating the mobile unit 2 is transmitted to the mobile unit 2 from the in-vehicle device 1, the display unit 27 and the buzzer 28 which is disposed at the mobile unit 2 operates, and informs the periphery of the fact that the mobile unit 2 exists. Accordingly, even when the mobile unit 2 is placed in the pocket of clothing or a bag which is located in the vehicle compartment, the user can easily find out the mobile unit 2 by the sound that is issued by the buzzer 28. Also, even in a state where the vehicle compartment is dark such as in the night, the user can easily find out the mobile unit 2 by the light that is emitted by the display unit 27.

Also, since the mobile unit 2 is retrieved by the in-vehicle device 1 that is mounted in the vehicle, a mobile unit locating device is not required. Also, unlike a compact mobile unit locating device, the in-vehicle device 1 does not suffer from such drawbacks that the user does not tuck the in-vehicle device 1 in some place, and also does not forget the place in which the in-vehicle device 1 is tucked.

Further, the mobile unit 2 changes the status of the mobile unit 2 to the limited state when receiving the search signal. Then, when the status of the mobile unit 2 is changed to the limited state, at least a part of the various controls that can be executed by the in-vehicle device 1 is not executed.

Accordingly, the functions having the possibility that there occur damages such as vehicle theft or the theft of articles within the vehicle compartment or the trunk compartment are limited, thereby making it possible to prevent the above respective damages. Also, the authorized user returns the status of the mobile unit 2 from the limited state to the normal state by conducting given operation or by the aid of a dedicated device, thereby making it possible to cancel the limitation at the vehicle side.

Also, in the case of the electronic key system, when the mobile unit 2 exists in the vehicle exterior where the possibility that the mobile unit 2 is picked up by the prowler is comparatively high, the status of the mobile unit 2 is changed from the normal state to the limited state. On the other hand, when the mobile unit 2 exists in the vehicle compartment where the possibility that the mobile unit 2 is picked up by the prowler is low, the status of the mobile unit 2 is not changed from the normal state. Accordingly, it is possible to balance both functions, one being the security measure when the mobile unit 2 is picked up by the prowler, and the other being convenience when the user leaves the mobile unit 2 in the vehicle compartment.

The electronic key system can instruct the locating of the mobile unit 2 by the aid of the cell phone 34, and the locating result is reported to the cell phone 34. As a result, it is unnecessary to provide the display device and an input device which form the user interfaces in the in-vehicle device 1. The user can conduct the locating operation by the cell phone 34, which the user is familiar with and can operate without difficulty.

When the mobile unit 2 is located, since the user is informed that the mobile unit 2 is in the vehicle compartment, in the vehicle exterior, or is not found out, the user can conduct an appropriate countermeasure according to the state.

The search signal is transmitted by the electric waves of the different frequency bands when the vehicle compartment is searched or the vehicle exterior is searched. Therefore, the detection range is appropriately narrowed down, and where the mobile unit 2 has been found out can be appropriately reported to the user, unlike a case in which only the appropriate frequency band is used in limiting the detection area to the vehicle compartment, or a case in which only the appropriate frequency band is used in ensuring the communication distance.

In particular, since the LF band and the UHF band are used as the different frequency bands, the detection area of the mobile unit 2 can be easily limited to about 1 to 3 m in the periphery of the vehicle in the communication of the LF band. On the other hand, in the communication of the UHF band, the communication distance of several tens meters can be ensured when the output level at the transmission side is slight, and the communication distance of about several hundreds to thousand meters can be ensured when the output level is more increased. As a result, the detection area can be easily widely set.

(Modifications)

The present invention is not limited to the above specific embodiments, and can be implemented in other configurations.

For example, in the above embodiments, when the mobile unit 2 is to be located, the use of the smart entry function of the mobile unit 2 is limited. However, when the mobile unit 2 has the remote keyless entry function, the use of the remote keyless entry function may be also limited.

Figure 9A:
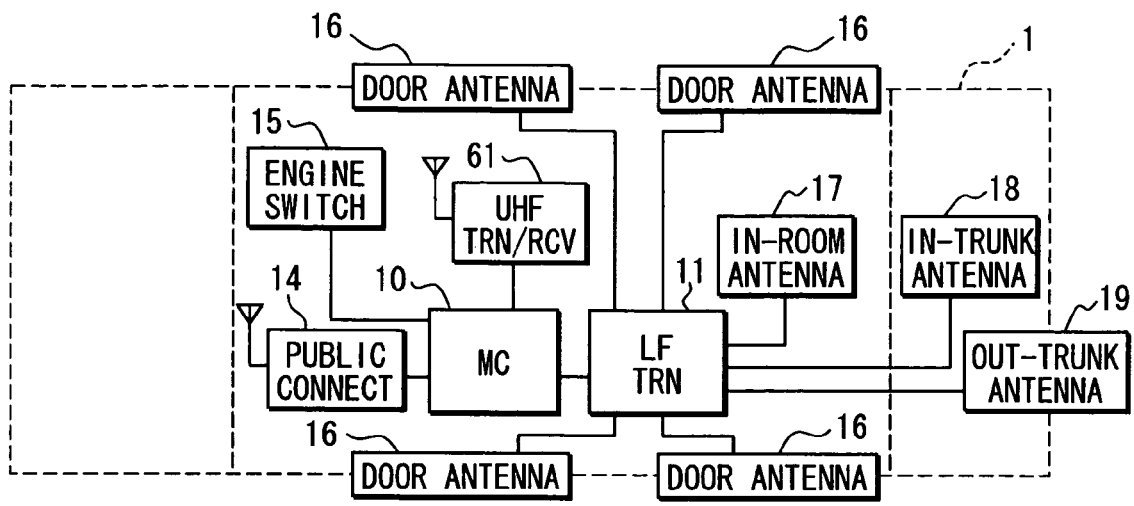
FIGS. 9A and 9B are block diagrams showing a modified example of an electronic key system according to the second embodiment.

In the above second embodiment, the UHF transmitter unit 41 is newly disposed in addition to the existing UHF receiver unit 12. Alternatively, a UHF transmitter/receiver unit 61 may be disposed in the in-vehicle device 1 as shown in FIG. 9A instead of the UHF receiver unit 12 and the UHF transmitter unit 41.

Figure 9B:
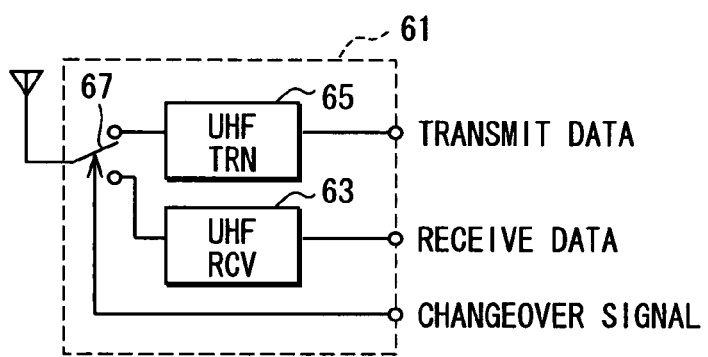

As shown in FIG. 9B, the UHF transmitter/receiver unit 61 is so configured as to internally include a UHF receiver unit 63 and a UHF transmitter unit 65. A transmit/receive changeover switch 67 changes over whether the reception is to be conducted by the UHF receiver unit 63, or the transmission is to be conducted by the UHF transmitter unit 65.

The UHF transmitter/receiver unit 61 is so configured as to change over the transmission or reception by the transmit/receive changeover switch 67 to conduct a half-duplex communication. This configuration can be replaced with another configuration when the transmission/reception can be implemented. For example, the transmit/receive changeover switch 67 is replaced with a circulator, thereby conduct the transmission/reception by a full duplex communication.

In addition, the above second embodiment shows an example in which the cell phone 34 transmits or receives the electronic mail with respect to the management server 33. Data can be delivered in any data format in a communication between the in-vehicle device 1 and the management server 33, or a communication between the cell phone 34 and the management server 33. In this situation, any communication protocol can be used.

For example, when the in-vehicle device 1 has an electronic mail transmitting function, since the electronic mail can be transmitted to the cell phone 34 via the mail server, the above configuration can be applied.

Also, in the above embodiments, the fact that the mobile unit 2 has been found is described in the electronic mail. Instead, an address (URL) on Internet can be described in the electronic mail. In this case, when the cell phone 34 accesses to the address, a web page that is distributed from the web server is displayed, and information indicative of the fact that the mobile unit 2 has been found out can be displayed in the web page.

The above embodiments may further be modified to an electronic key system for door control of other objects, which may include a home and an office.

What is claimed is:

1. An electronic key system comprising:
an in-vehicle device mounted in a vehicle; and
a mobile unit carried by a user for conducting radio communication with the in-vehicle device to conduct an authentication necessary to execute predetermined controls by the in-vehicle device,
wherein the in-vehicle device includes search signal transmitting means that transmits a search signal for locating the mobile unit,
wherein the mobile unit includes search signal receiving means for receiving the search signal transmitted from the in-vehicle device, and notifying means for notifying reception of the search signal by the search signal receiving means, and
wherein the mobile unit includes status changing means for changing a status of the mobile unit from a normal state to a limited state when the search signal receiving means receives the search signal;
when the status of the mobile unit is changed to the limited state, the mobile unit stops transmission of a radio signal to the in-vehicle device, or the in-vehicle device stops at least a part of predetermined controls thereof by determining that the status of the mobile unit is changed to the limited state on the basis of the radio signal transmitted from the mobile unit and limiting execution of the predetermined controls; and
the status changing means checks whether the mobile unit is out of the vehicle on the basis of the search signal received by the search signal receiving means, and changes the status of the mobile unit from the normal state to the limited state when the mobile unit is out of the vehicle.

2. The electronic key system according to claim 1, wherein: the status changing means returns the status of the mobile unit from the limited state to the normal state in response to a limit cancel instruction that is generated by any one of an input operation of the user and a radio communication with another device including the in-vehicle device.

3. The electronic key system according to claim 1, wherein: the mobile unit includes search response signal transmitting means for transmitting a search response signal that is a response to the search signal when the search signal receiving means receives the search signal; and the in-vehicle device includes search response signal receiving means for receiving the search response signal transmitted from the mobile unit.

4. The electronic key system according to claim 1, wherein: the in-vehicle device includes a first transmitter and a second transmitter that communicates with the mobile unit by electric waves of a first frequency band and a second frequency band, respectively, which are different from each other, the mobile unit includes a first receiver and a second receiver that communicates with the in-vehicle device by the electronic waves of the first frequency band and the second frequency band, respectively, and the search signal transmitting means transmits the search signal by using both of the first frequency band and the second frequency band in turn.

5. The electronic key system according to claim 4, wherein: the second frequency band is higher than the first frequency band.

6. The electronic key system according to claim 5, wherein: the first frequency band and the second frequency band are an LF band and a UHF band, respectively.

7. An electronic key system comprising:
an in-vehicle device mounted in a vehicle; and
a mobile unit carried by a user for conducting radio communication with the in-vehicle device to conduct an authentication necessary to execute predetermined controls by the in-vehicle device,
wherein the in-vehicle device includes search signal transmitting means that transmits a search signal for locating the mobile unit, and
wherein the mobile unit includes search signal receiving means for receiving the search signal transmitted from the in-vehicle device, and notifying means for notifying reception of the search signal by the search signal receiving means,
wherein the mobile unit includes search response signal transmitting means for transmitting a search response signal; and
the in-vehicle device includes search response signal receiving means for receiving the search response signal transmitted from the mobile unit;
wherein the in-vehicle device includes:
external communicating means for communicating with an external communication terminal that is connectable to a wide-area communication network via the wide-area communication network; and
notifying means for notifying the external communication terminal that the mobile unit has been found out when the search response signal receiving means receives the search response signal;
wherein the mobile unit includes status changing means for changing a status of the mobile unit from a normal state to a limited state when the search signal receiving means receives the search signal;
when the status of the mobile unit is changed to the limited state, the mobile unit stops transmission of a radio signal to the in-vehicle device, or the in-vehicle device stops at least a part of predetermined controls thereof by determining that the status of the mobile unit is changed to the limited state on the basis of the radio signal transmitted from the mobile unit and limiting execution of the predetermined controls; and the status changing means checks whether the mobile unit is out of the vehicle on the basis of the search signal received by the search signal receiving means, and changes the status of the mobile unit from the normal state to the limited state when the mobile unit is out of the vehicle.

8. The electronic key system according to claim 7, wherein: the search signal transmitting means transmits the search signal to a plurality of different areas; and the notifying means notifies in which of the plurality of areas the mobile unit exists.

9. The electronic key system according to claim 7, wherein: the notifying means notifies the external communication terminal that the mobile unit has not been found out by using the external communication means, when the search response signal receiving means does not receive the search response signal.

10. The electronic key system according to claim 7, wherein: the search signal transmitting means transmits the search signal when a locating request transmitted from the external communication terminal reaches the in-vehicle device via the external communication means.

11. An electronic door control method comprising:
conducting radio communication with an in-object device provided in a control object by a mobile unit carried by a user thereby to conduct an authentication of the mobile unit;
allowing predetermined controls on a door of the control object by the mobile unit when the mobile unit is authenticated;
transmitting a search signal from the in-object device for locating the mobile unit; and
issuing a notification from the mobile unit in response to reception of the search signal;
wherein the transmitting step transmits the search signal within the control object at time of a predetermined operation for locking the door;
the issuing step issues both sound and light as the notification; and
the door is inhibited by the in-object device from being locked when the notification is issued by the mobile unit;
transmitting a response signal from the mobile unit to the in-object device in return to the search signal, the response signal being in one of plural different frequency bands in correspondence to a frequency band of the search signal transmitted from the in-object device;
determining a location of the mobile unit by the in-object device based on which of plural different frequency bands of the response signal is received from the mobile unit; and
transmitting a message indicating a determined location of the mobile unit to an outside of the control object.

* * * * *